(12) United States Patent
Terada

(10) Patent No.: US 7,814,637 B2
(45) Date of Patent: Oct. 19, 2010

(54) INSTALLATION APPARATUS

(75) Inventor: Tomoyasu Terada, Kosai (JP)

(73) Assignee: Yazaki Corporation, Tokyo (JP)

( * ) Notice: Subject to any disclaimer, the term of this patent is extended or adjusted under 35 U.S.C. 154(b) by 180 days.

(21) Appl. No.: 11/504,732

(22) Filed: Aug. 16, 2006

(65) Prior Publication Data

US 2007/0087618 A1    Apr. 19, 2007

(30) Foreign Application Priority Data

Oct. 18, 2005    (JP)    ............................ P2005-303293

(51) Int. Cl.
*B23P 11/00*    (2006.01)
*H01R 4/24*    (2006.01)

(52) U.S. Cl. ............................. 29/434; 29/748; 29/755; 29/469; 296/155; 174/113 R; 439/34

(58) Field of Classification Search .................. 29/748, 29/766, 742, 772, 434, 469; 297/344.1, 344.11, 297/344.18, 378.1, 399; 439/34, 397, 247; 296/155; 174/135, 72 A See application file for complete search history.

(56) References Cited

U.S. PATENT DOCUMENTS

| | | | | |
|---|---|---|---|---|
| 5,785,292 | A * | 7/1998 | Muraishi et al. | 248/429 |
| 5,800,015 | A * | 9/1998 | Tsuchiya et al. | 297/331 |
| 5,881,702 | A * | 3/1999 | Arkfeld | 123/538 |
| 6,343,939 | B1 * | 2/2002 | Inoue | 439/34 |
| 6,494,523 | B2 * | 12/2002 | Kobayashi | 296/155 |
| 6,515,229 | B2 * | 2/2003 | Aoki et al. | 174/72 A |
| 6,547,331 | B2 * | 4/2003 | Kunisawa et al. | 297/344.1 |
| 6,818,827 | B2 * | 11/2004 | Kato et al. | 174/72 A |
| 7,238,029 | B2 * | 7/2007 | Tsubaki | 439/34 |

(Continued)

FOREIGN PATENT DOCUMENTS

JP    51-162996    12/1978

(Continued)

OTHER PUBLICATIONS

Japanese Office Action dated Sep. 29, 2009.

*Primary Examiner*—Derris H Banks
*Assistant Examiner*—Tai Nguyen
(74) *Attorney, Agent, or Firm*—Sughrue Mion, PLLC

(57) ABSTRACT

An installation apparatus for installing a wire harness over a fixed structural body and a movable structural body which is slidingly movable to the fixed structural body, the installation apparatus includes a case that receives the wire harness such that the wire harness extends in a sliding direction of sliding movement of the movable structural body, and is folded back into a generally U-shape; and a slider that holds a distal end-side portion of the wire harness extending from the folded-back portion toward a distal end of the wire harness, and is slidably supported on the case so as to move in the sliding direction of the movable structural body, and is operatively connected to the movable structural body so as to move in accordance with the sliding movement of the movable structural body. A slit is formed in a wall of the case, and extends in the sliding direction of the movable structural body. The slit is arranged so as to intersect the folded-back portion of the wire harness in view of above of the wall in which the slit is formed. The distal end-side portion of the wire harness is led out from the case through the slit.

8 Claims, 6 Drawing Sheets

U.S. PATENT DOCUMENTS

| | | | |
|---|---|---|---|
| 7,402,044 B2 * | 7/2008 | Terada | 439/34 |
| 2005/0035622 A1 * | 2/2005 | Tsubaki et al. | 296/65.13 |

FOREIGN PATENT DOCUMENTS

| | | | |
|---|---|---|---|
| JP | 59-183392 | | 12/1984 |
| JP | 6-351144 | | 12/1994 |
| JP | 9-56046 | | 2/1997 |
| JP | 2004242434 | * | 8/2004 |
| JP | 2005-59745 A | | 3/2005 |

* cited by examiner

FIG. 7          PRIOR ART

INSTALLATION APPARATUS

BACKGROUND OF THE INVENTION

This invention relates to an installation apparatus for installing a wire harness over a fixed structural body (such for example as a vehicle body of an automobile) and a movable structural body (such as a slide seat or a slide door) movable relative to the vehicle body.

For example, an electrically-operated auxiliary equipment such as an electrically-operated slide mechanism is contained in a slide seat and a slide door of a vehicle such as an automobile. A wire harness is installed over a vehicle body and the slide seat or the slide door in order to supply electric power to such auxiliary equipment. FIG. 7 shows one known related installation apparatus for installing a wire harness over a vehicle body and a slide door (see, for example, JP-A-2005-59745).

As shown in FIG. 7, the installation apparatus 101 disclosed in Patent Literature 1 comprises a box-like case 103 (made of a synthetic resin) receiving the wire harness 102 folded back in a U-shape, and a movable member 104 supported on the case 103 so as to move in a direction of sliding movement of the slide seat. The case 103 includes a harness receiving portion 105 for receiving the wire harness 102, and a movable member movement portion 106 disposed adjacent to the harness receiving portion 105. The harness receiving portion 105 and the movable member movement portion 106 are separated from each other by a partition wall 107 formed on and projecting from a bottom wall of the case 103.

A slit 108 is formed in an upper wall of the movable member movement portion 106 of the case 103, and extends in the direction of sliding movement of the slide seat, and the movable member 104 passes through this slit 108. The movable member 104 is inserted into the case 103 through the slide 108, and its harness fixing portion 109 is received within the case 103. This harness fixing portion 109 is disposed beyond the partition wall 107, and therefore is disposed within the harness receiving portion 105, and this harness fixing portion 109 holds a distal end-side portion of the wire harness 102 extending from the folded-back portion thereof toward a distal end thereof.

The distal end-side portion of the wire harness 102 is held by the harness fixing portion 109 of the movable member 104, and is disposed along a harness installation portion 110 of the movable member 104, and is led out of the case 103. The wire harness 102 is connected to an auxiliary equipment of the slide seat and others through a connector 111 provided at the distal end of this wire harness 102. In accordance with the sliding movement of the slide seat, the movable member 104, holding the distal end-side portion of the wire harness 102, moves together with the slide seat while suitably deforming the wire harness 102 within the case 103.

In the above installation apparatus 101, the distal end-side portion of the wire harness 102, connected to the slide seat, is led out of the case 103 through the slide 108 formed in the upper wall of the movable member movement portion 106 of the case 103 disposed adjacent to the harness receiving portion 105. Namely, the case 103 need to include not only the portion for receiving the wire harness 102 but also the additional portion through which the wire harness 102 is led to the exterior. This leads to a possibility that the installation apparatus 101 is prevented from having a compact design.

Furthermore, in the installation apparatus 101, the slit 108 extends from the vicinity of a front end edge of the upper wall of the case 103 to the vicinity of a rear end edge thereof in the direction of sliding movement of the slide seat. Therefore, the upper wall of the case 103 is divided generally into two wall sections, and particularly with respect to the division wall section serving as the upper wall of the harness receiving portion 105, the distance from its one side edge (exposed to the slit 108) to the other side edge thereof (supported by a side wall of the case 103) is long. Therefore, it is feared that the strength of this upper wall portion is not sufficient to withstand a load applied from the upper side. And besides, it is feared that the upper wall, when deformed, contacts the wire harness received within the case 103, and damages this wire harness.

In order to overcome the insufficient strength of the upper wall of the case 103, the case 103 is, in some cases, made of iron instead of using a synthetic resin. In this case, it is feared that the weight of the installation apparatus 101 increases, and besides a coating or plating for anti-corrosion purposes need to be applied to the surface of the case 103, and costs are required for disposing of the coating and a plating solution for the purpose of environmental preservation.

Furthermore, in the box-like case 103, its upper wall is usually formed as a lid separately from its body portion, and this lid is fixed to the body portion by welding or fastening member. Much time and labor are required for this fixing operation, and besides it is feared that the weight of the installation apparatus 101 is increased by weights of flange portions and fastening members used for welding and fastening purposes.

SUMMARY OF THE INVENTION

This invention has been made in view of the above circumstances, and an object of the invention is to provide an installation apparatus in which the strength of a case for receiving a wire harness can be increased, thereby preventing damage of the wire harness received in the case, and besides a compact and lightweight design of the installation apparatus can be achieved.

The above object has been achieved by an installation apparatus of the present invention recited in the following Paragraphs (1) to (5).

(1) An installation apparatus for installing a wire harness over a fixed structural body and a movable structural body which is slidably provided to the fixed structural body, the installation apparatus comprising:

a case that receives the wire harness such that the wire harness extends in a sliding direction of the movable structural body, and is folded back into a generally U-shape; and a slider that holds a distal end-side portion of the wire harness extending from the folded-back portion toward a distal end of the wire harness, and is slidably supported on the case so as to move in the sliding direction of the movable structural body, and is movable in accordance with a sliding movement of the movable structural body, wherein a slit is formed in a wall of the case, and extends in the sliding direction of the movable structural body;

wherein the slit is arranged on the wall so as to intersect the folded-back portion of the wire harness in view of above of the wall in which the slit is formed; and wherein the distal end-side portion of the wire harness is led out from the case through the slit.

(2) The installation apparatus of the above Paragraph (1) further comprises a protector that is received within the case so as to move in the sliding direction of the movable structural body, and covers the folded-back portion of the wire harness.

(3) The installation apparatus of the above Paragraph (2), wherein the protector includes a support portion which extends along a part of the wire harness extending from the folded-back portion thereof toward a proximal end of the wire harness, and supports the part of the wire harness.

(4) The installation apparatus of any one of the above Paragraphs (1) to (3), wherein the case includes:
   a tubular case body having the slit formed in a wall thereof so as to extend over an entire length of the wall in a longitudinal direction thereof; and
   caps respectively attached at opposite end portions of the case body to close opposite open ends of the case body; and
wherein the case body is formed by an aluminum material as a main component or a resin material.

(5) The installation apparatus of the above Paragraph (4), wherein each of the caps includes:
   a base plate portion closing the open end of the case body; and
   a fitting portion which is formed on and projects from the base plate portion, and is fitted in the end portion of the case body.

In the installation apparatus of the construction of the above Paragraph (1), the distal end-side portion of the wire harness, extending from the folded-back portion thereof toward the distal end thereof, is led out of the case through the slit formed in the wall of the case in intersecting relation to the folded-back portion of the wire harness. Namely, the distal end-side portion of the wire harness can be led to the exterior of the case directly from the region of the case where this wire harness is received, and with this construction, a compact design of the installation apparatus can be achieved.

In the installation apparatus of this construction, the slit is formed in the wall of the case in intersecting relation to the folded-back portion of the wire harness, and therefore the slit is formed generally in a widthwise-central portion of the wall of the case without being extremely offset to one of opposite side edges of this wall. Namely, even when the slit is formed in the wall of the case body to extend from the vicinity of a front end edge of the wall to the vicinity of a rear end edge thereof, so that the wall of the case is divided generally into two wall sections, the distance from one side edge of each of the two division wall sections (which is exposed to the slit) to the other side edge thereof supported by a side wall of the case will not become too large, and therefore the two division wall sections are prevented from having an insufficient strength.

In the installation apparatus of the construction of the above Paragraph (1), the slit is formed in the upper wall of the case in intersecting relation to the folded-back portion of the wire harness as described above, and therefore the folded-back portion of the wire harness is exposed to the exterior through this slit, and there is a possibility that a member which can pass through the slit intrudes through the slit, and is brought into contact with the folded-back portion of the wire harness. In the installation apparatus of the construction of the above Paragraph (2), however, the folded-back portion of the wire harness is covered with the protector, and therefore damage to the wire harness can be prevented.

In the installation apparatus of the construction of the above Paragraph (3), the proximal end-side portion of the wire harness, extending from the folded-back portion thereof toward the proximal end thereof, is prevented by the support portion of the protector from being bent in a meandering manner, and therefore damage to the wire harness can be prevented.

Furthermore, the upper wall of the case is prevented from having the insufficient strength as described above, and therefore the material comprising aluminum as the main component or the resin material which are inferior in strength to an iron material can be used to form the case body. In the installation apparatus of the construction of the above Paragraph (4), the tubular case body has the slit formed in the upper wall thereof and extending over the entire length thereof in the longitudinal direction thereof, and this case body is made of the material comprising aluminum as the main component or the resin material, and is formed by extrusion.

The material, comprising aluminum as the main component, and the resin material are more lightweight and excellent in corrosion resistance than an iron material, and therefore the installation apparatus of this construction can be formed into a lightweight design. And besides, any surface treatment for anti-corrosion purposes, such as a coating or plating, does not need to be applied to the case body, and this contributes to preservation of the environment, and also the cost of the installation apparatus can be reduced.

Furthermore, the case body, having a suitable length determined by the amount of sliding movement of a slide seat, can be formed by a single integral member produced by extrusion, and therefore in the installation apparatus of this construction, welding/fastening regions are eliminated, so that the installation apparatus can be assembled easily, and besides the lightweight design of the installation apparatus can be achieved.

In the installation apparatus of the construction of the above Paragraph (5), although the slit is formed in the upper wall of the case body, and extends over the entire length thereof, the opposite side walls of the case body 11 are prevented for tilting inwardly, and also the upper wall of the case body (which is divided by the slit into the two division wall sections each supported in a cantilever-like manner) is prevented from being bent, since the fitting portions of the caps are fitted respectively in the opposite end portions of the case body. Therefore, the strength of the case body can be further increased.

In the present invention, there can be provided the installation apparatus in which the strength of the case for receiving the wire harness can be increased, thereby preventing damage of the wire harness received in the case, and besides the compact and lightweight design of the installation apparatus can be achieved.

BRIEF DESCRIPTION OF THE DRAWINGS

The above objects and advantages of the present invention will become more apparent by describing in detail preferred exemplary embodiments thereof with reference to the accompanying drawings, wherein:

FIG. 7 is an exploded, perspective view of a related installation apparatus.

DETAILED DESCRIPTION OF THE PREFERRED EMBODIMENTS

A preferred embodiment of an installation apparatus of the present invention will now be described in detail with reference to the drawings.

Figure 1:
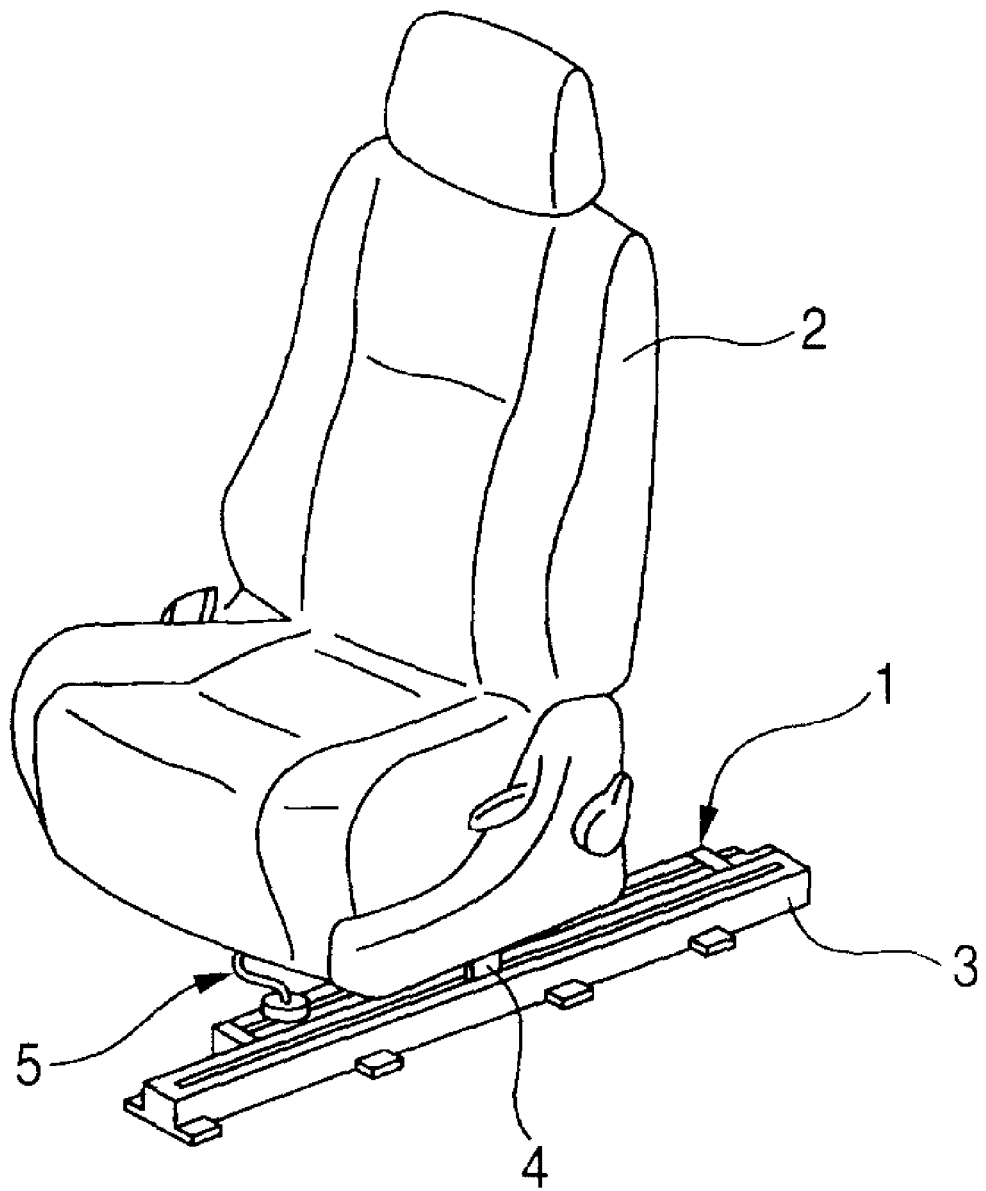
FIG. 1 is a perspective view showing one preferred embodiment of an installation apparatus of the present invention applied to a slide seat for a vehicle.
Figure 2:
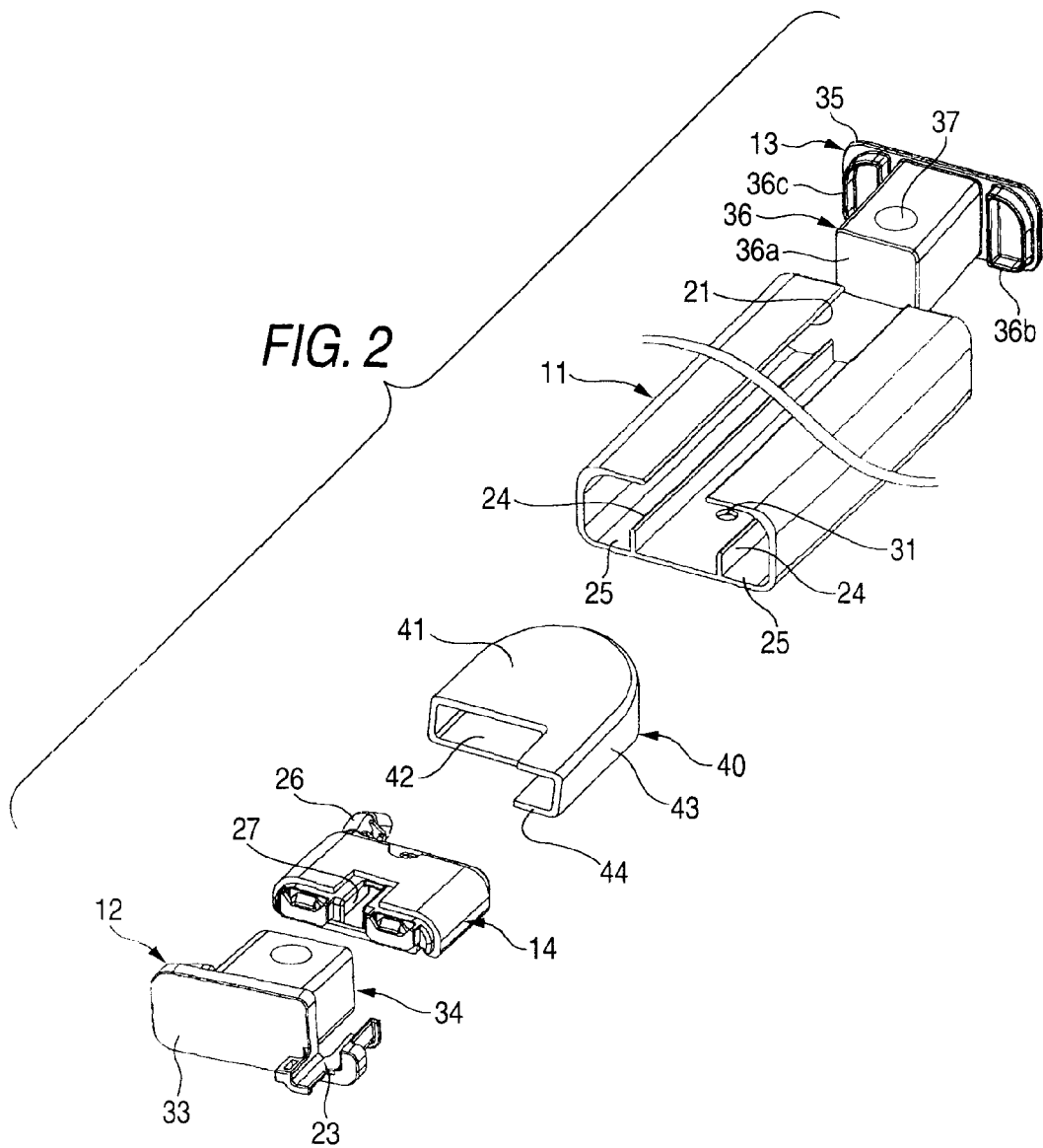
FIG. 2 is an exploded, perspective view of the installation apparatus of FIG. 1.
Figure 3:
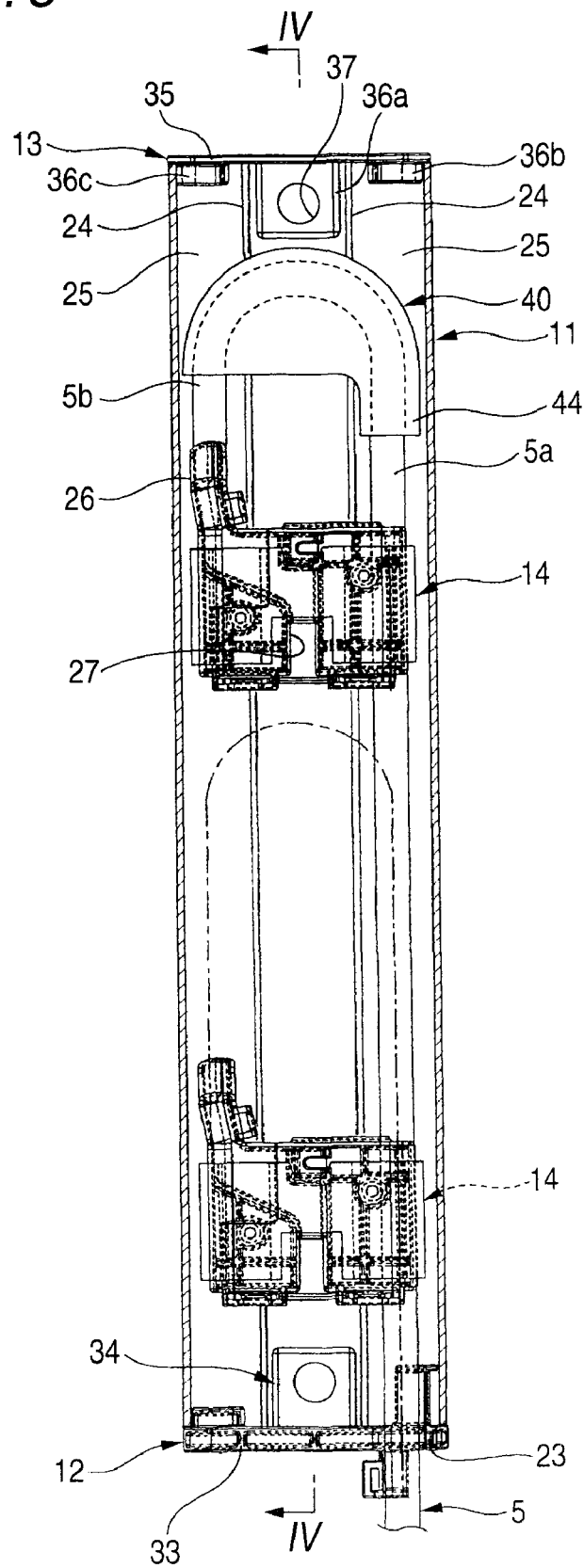
FIG. 3 is a plan view of the installation apparatus of FIG. 1.
Figure 4:
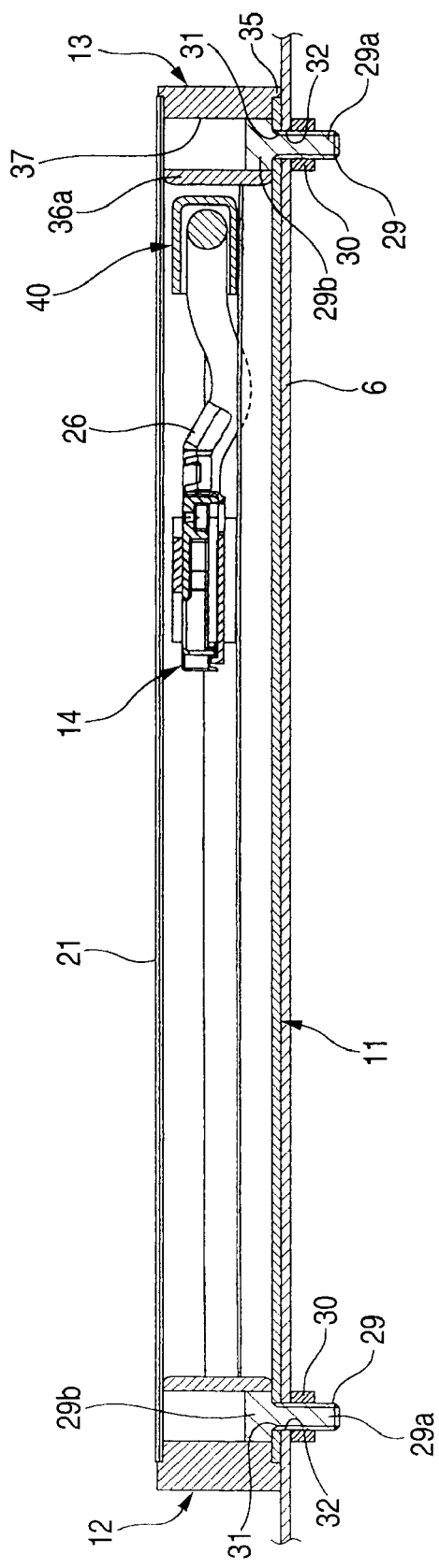
FIG. 4 is a cross-sectional view taken along the line IV-IV of FIG. 3.
Figure 5:
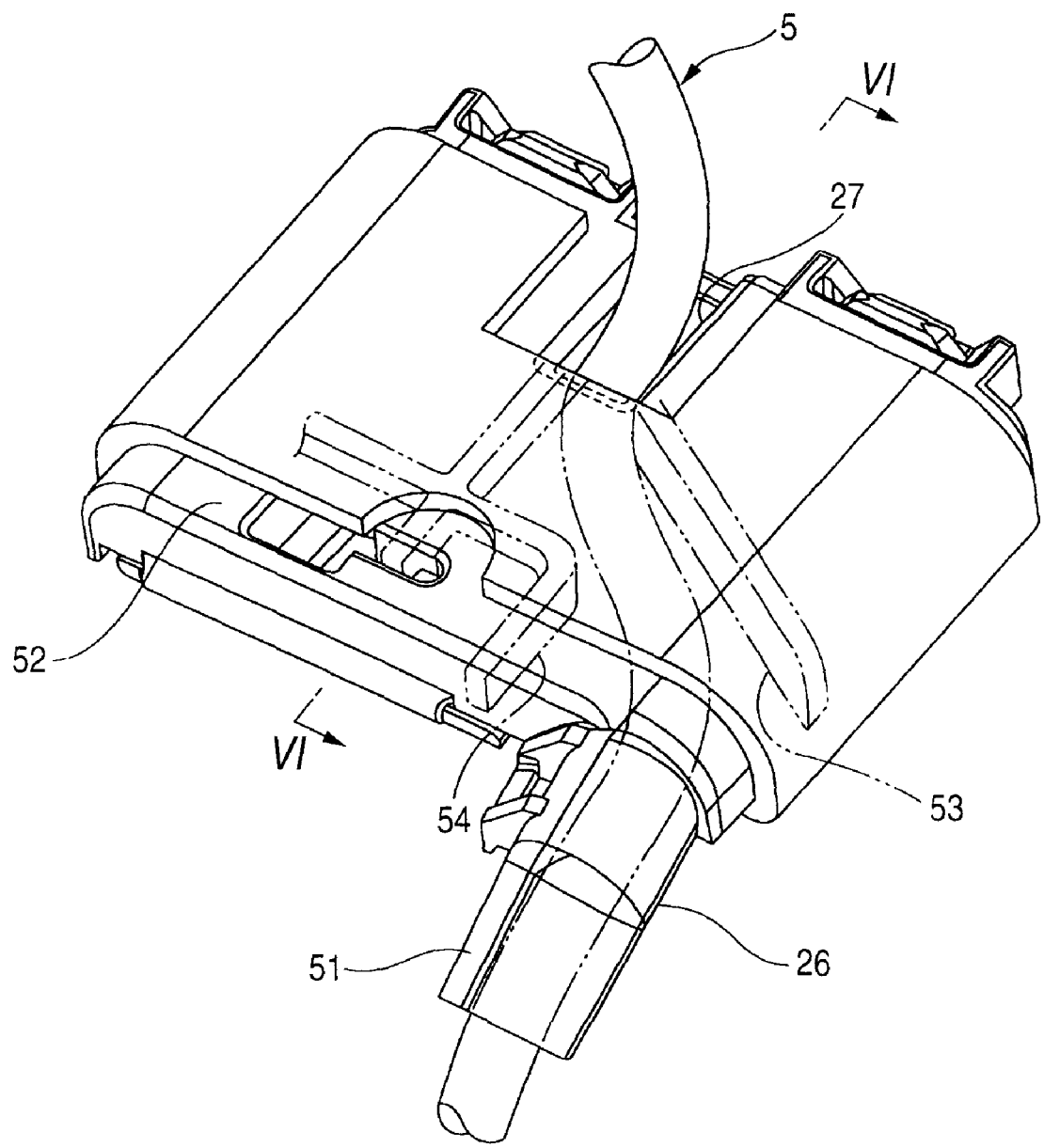
FIG. 5 is a perspective view of a slider of FIG. 2.
Figure 6:
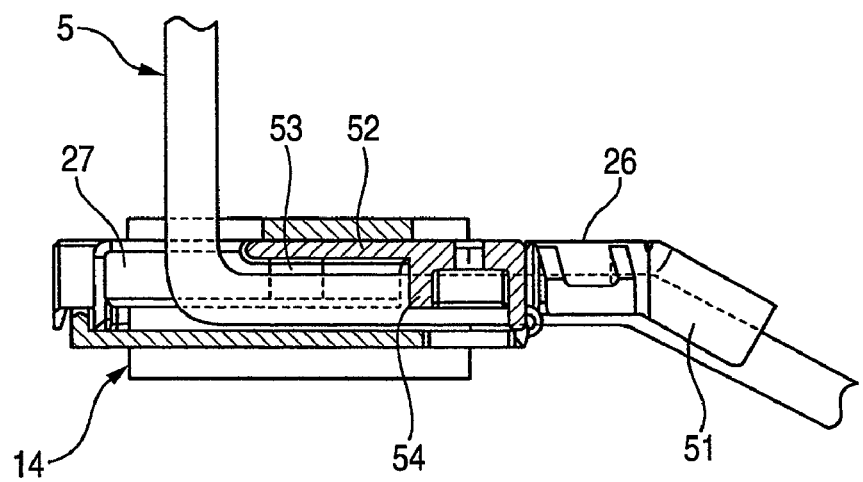
FIG. 6 is a cross-sectional view taken along the line VI-VI of FIG. 5.
Figure 6:
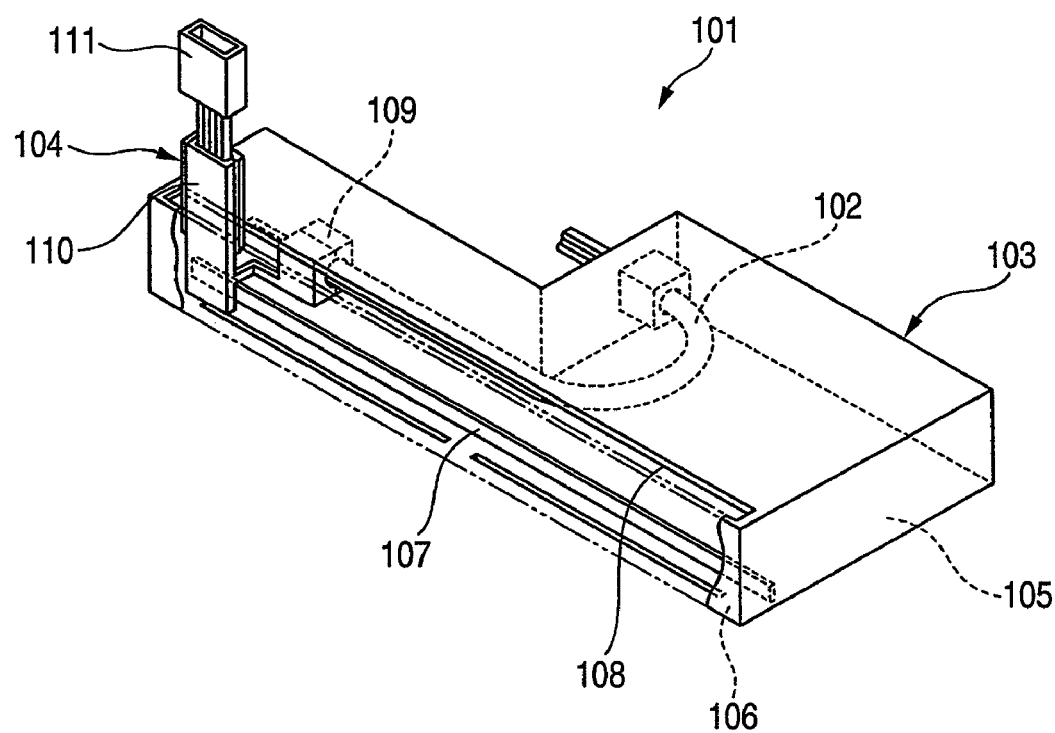

FIG. 1 is a perspective view showing one preferred embodiment of the installation apparatus of the invention applied to a slide seat for a vehicle, FIG. 2 is an exploded, perspective view of the installation apparatus of FIG. 1, FIG. 3 is a plan view of the installation apparatus of FIG. 1, FIG. 4 is a cross-sectional view taken along the line IV-IV of FIG. 3, FIG. 5 is a perspective view of a slider of FIG. 2, and FIG. 6 is a cross-sectional view taken along the line VI-VI of FIG. 5.

As shown in FIG. 1, the installation apparatus 1 of this embodiment is applied to the slide seat (movable structural body) 2 for the vehicle. A guide rail 3 is mounted on a vehicle body (fixed structural body; see FIG. 4) 6, and extends in a forward-rearward direction of the vehicle body 6. The slider 4 is mounted on a bottom surface of the slide seat 2, and is engaged in the guide rail 3, and is supported on this guide rail 3 so as to slide in the forward-rearward direction of the vehicle body 6. With this construction, the slide seat 2 can slide in the forward-rearward direction of the vehicle body 6. The installation apparatus 1 is provided along the guide rail 3 in parallel, adjoining relation thereto, and installs a wire harness 5 over the vehicle body 6 and the slide seat 2.

As shown in FIG. 2, the installation apparatus 1 comprises a case 10, the slider 14 received within the case 10, and a protector 40 which is received in the case 10, and covers a folded-back portion of the wire harness which is received within the case 10, and is folded back into a U-shape. The case 10 includes a case body 11 in the form of an elongate rectangular tubular member having a slit 21 formed in its upper wall and extending in its longitudinal direction, and caps 12 and 13 mounted respectively at opposite end portions of the case body 11 to close these open ends. The case body 11 is mounted on the vehicle body 6, with its longitudinal axis disposed parallel to the direction of sliding movement of the slide seat 2.

An opening 23 is formed in one side of the cap 12 mounted at one end portion of the case body 11, and the wire harness 5, extending from the vehicle body 6, is introduced or led into the case 10 through this opening 23. The wire harness 5, led into the case 10 through this opening 23, is received in the case 10 in such a manner that this wire harness 5 is folded back into a U-shape as shown in FIG. 3. In FIG. 3, the case body 11 is shown with its upper wall removed.

As shown in FIG. 2, two ribs 24 and 24 are formed on and project from a bottom wall of the case body 11, and extend in the longitudinal direction of the case body 11, and are spaced from each other. A gap (hereinafter referred to as "wire harness receiving region 25") for receiving the wire harness 5 is formed between each rib 24 and a side wall of the case body 11 opposed to this rib 24. As shown in FIG. 2, the distance between the two ribs 24 and 24 is larger than a width of the slit 21, and are disposed beneath the slit 21 in a vertical direction. When foreign matters intrude into the case 10 through the slit 21, these foreign matters are received in the region between the two ribs 24 and 24.

As shown in FIGS. 3 and 4, the wire harness 5, led into the case 10 through the opening 23 in the cap 12, is laid to extend in and along one wire harness receiving region 25 communicating with the opening 23, and then is folded back into a U-shape while passing over the ribs 24 and 24, and is further laid to extend in and along the other wire harness receiving region 25. Namely, the two ribs 24 and 24 are disposed between an outward portion 5a and a return portion 5b of the wire harness 5 extending in the longitudinal direction of the case body 11, and in other words the two ribs 24 and 24 are arranged to intersect the U-shaped folded-back portion of the wire harness 5.

As shown in FIGS. 2 to 4, the protector 40 includes a pair of opposed upper and bottom plate portions 41 and 42 each in the form of a generally semi-circular plate, and a side plate portion 43 interconnecting curved peripheral edges of the upper and bottom plate portions 41 and 42. This protector 40 is formed such that it is slightly spaced from the upper wall and opposite side walls of the case body 11 and the two ribs 24 and 24, and the protector 40 is placed on the two ribs 24 and 24, and is supported for sliding movement in the longitudinal direction of the case body 11. The protector 40 receives the folded-back portion of the wire harness 5 therein in such a manner that this folded-back portion can slide in contiguous relation to an inner peripheral surface of the arc-shaped side plate portion 43.

The protector 40 further includes a support portion 44 which extends along that portion of the wire harness 5 extending from the folded-back portion thereof toward the proximal end thereof through an opening of the protector 40, and supports this portion of the wire harness. The support portion 44 is formed by extending the upper plate portion 41, the bottom plate portion 42 and the side plate portion 43 (which jointly define the opening of the protector 40) at one side of the opening of the protector 40, the support portion 44 having a generally U-shaped cross-section.

As shown in FIGS. 3 and 4, the slider 14 which is received within the case 10 is formed such that it is slightly spaced from the upper wall and opposite side walls of the case body 11 and the two ribs 24 and 24, and is placed on the two ribs 24 and 24, and is supported for sliding movement in the longitudinal direction of the case body 11. The slider 14 can slide on inner surfaces of the opposite side walls of the case body 11 and upper edges of the two ribs 24 and 24, and therefore the sliding movement of the slider is guided by these inner surfaces and these upper edges. In other words, the whole of the case body 11 functions as a guide rail for guiding the sliding movement of the slider 14.

As shown in FIGS. 2 to 6, a holding portion 26 is formed on and extends from one end of the slider 14, and this holding portion 26 extends along the other wire harness receiving region 25 (in which that portion (i.e., the return portion 5b) of the wire harness 5, extending from the folded-back portion thereof toward the distal end thereof, is laid). This holding portion 26 introduces the wire harness 5 into the slider 14, and holds the wire harness 5. This holding portion 26 includes a support piece portion 51 conforming in contour or outer shape to the wire harness, and the wire harness 5 is fastened to the support piece portion 51, for example, by a fastening band, and by doing so, the holding portion 26 holds the wire harness 5.

Ribs 53 and 54 are formed within the slider 14, and more specifically these ribs 53 and 54 are formed on and project vertically downwardly from an upper wall portion 52 of the slider 14, and cooperate with each other to define a passage leading to an upwardly-open opening 27 formed in a widthwise-central portion of the slider 14. The distal end of the wire harness 5, introduced into the slider 14 through the holding portion 26, passes through the passage formed between the ribs 53 and 54, and is led out of the slider 14 through the opening 27.

Referring to FIG. 1, the slit 21 is formed in a widthwise-central portion of the upper wall of the case body 11, and the opening 27 of the slider 14 is exposed to the slit 21 in the case body 11. The distal end of the wire harness 5, led out of the slider 14 through the opening 27 thereof, is further led out of the case 10 through the slit 21 formed in the upper wall of the case body 11, and is connected to an auxiliary equipment of the slide seat 2 and others. The slider 14 is connected via the slit 21 to the slide seat 2, for example, by a hook, and can slide together with the slide seat 2.

In accordance with the sliding movement of the slide seat 2, the slider 14, holding the predetermined portion of the wire harness 5, slides in sliding contact with the inner surfaces of the opposite side walls of the case body 11 and the upper edges of the two ribs 24 and 24 (that is, while guided by these inner surfaces and these upper edges) while suitably deforming the wire harness 5 within the case 10, with the folded-back portion of the wire harness 5 moved forward and rearward in the direction of sliding movement of the slider 14, as shown in FIG. 3. One side portion of the slider 14 overlies the outward portion 5a of the wire harness 5, and the slider 14 slides while suppressing the lifting of the outward portion 5a off the bottom wall of the case body 11.

An engagement portion (not shown) is formed within the protector 40 covering the folded-back portion of the wire harness 5, and this engagement portion is disposed inwardly of the U-shaped folded-back portion of the wire harness 5, and is engaged with this folded-back portion. The folded-back portion of the wire harness 5, when moved forward and rearward, slidably contacts and presses the side wall portion 43 or the engagement portion of the protector 40, so that the protector 40 also moves forward and rearward together with the folded backed portion. The engagement portion can take any suitable form, and examples thereof include a cylindrical projection and a wall member curved into an arc-shape as is the case with the side wall portion 43.

As shown in FIG. 1, the slit 21 is formed in the widthwise-central portion of the upper wall of the case body 11, and extends over the entire length of the case body 11 in the longitudinal direction thereof. The case body 11 is formed by extruding a material comprising aluminum as a main component or by extruding a resin material, and the case body 11 is formed into a suitable length determined by the amount of sliding movement of the slide seat. As shown in FIG. 4, the case body 11 is fastened to the vehicle body 6 by fastening members each comprising a bolt 29 and a nut 30 threaded on a threaded shank 29a of the bolt 29, and thus the case body 11 is mounted on the vehicle body 6.

Through holes 31 are formed through the widthwise-central portion of the bottom wall of the case body 11 respectively at the opposite end portions thereof. The threaded shank 29a of each bolt 29 is passed through the through hole 31 in the case body 11 from the inside of this case body 11, and subsequently is passed through a through hole 32 formed through the vehicle body 6 in continuous relation to this through hole 31. Then, the nut 30 is threaded on a distal end portion of the threaded shank 29a projecting from the reverses surface of the vehicle body 6, and the bottom wall of the case body 11 and the vehicle body 6 are held between a head 29b of the bolt 29 and the nut 30.

As shown in FIGS. 2 to 4, the cap 12 which is mounted at the one end portion of the case body 11 includes a base plate 33 for closing the open end of the case body 11, and a fitting portion 34 which is formed on and projects from this base plate portion 33 so as to be fitted into the end portion of the case body 11. Similarly, the other cap 13 which is mounted at the other end portion of the case body 11 includes a base plate portion 35, and a fitting portion 36. The caps 12 and 13 have the same structure, and therefore the cap 13 will be described below.

The fitting portion 36 of the cap 13 is divided into three sections (that is, first, second and third fitting portions 36a, 36b and 36c) in the direction of the width of this cap. The second and third fitting portions 36b and 36c are disposed respectively at opposite sides of the widthwise-centrally-disposed first fitting portion 36a in such a manner that a gap for receiving one rib 24 is formed between the first and second fitting portions 36a and 36b while a gap for receiving the other rib 24 is formed between the first and third fitting portions 36a and 36c. The fitting portion 36 is fitted into the end portion of the case body 11 in such a manner that the first fitting portion 36a is inserted between the two ribs 24 and 24 and that the second and third fitting portions 36b and 36c are inserted respectively into the harness receiving regions 25.

A passage hole 37 for the passage of the bolt 29 therethrough is formed through the first fitting portion 36a of the cap 13 in the upward-downward direction, and is slightly larger in diameter than the head 29b of the bolt 29. An upper open end of this passage hole 37 is exposed to the slit 21 formed in the upper wall of the case body 11, and a lower open end of this passage hole 37 is continuous with the through hole 31 formed through the bottom wall of the case body 11.

The bolt 29 is passed sequentially through the slit 21 (here serving as a bolt passage opening in the case body 11) and the passage hole 37 in the cap 13, and the threaded shank 29a is passed through the through hole 31 in the case body 11 as described above, and the head 29b is disposed within the passage hole 37 in the cap 13. Namely, the head 29b of the bolt 29 (that is, one end of the fastening member) is inserted deep in the fitting portion 36 of the cap 13.

In the installation apparatus 1 of this invention, the distal end-side portion of the wire harness 5, extending from the folded-back portion thereof toward the distal end thereof, is led out of the case 10 through the slit 21 formed in the upper wall of the case body 11 in intersecting relation to the folded-back portion of the wire harness 5. Namely, the distal end-side portion of the wire harness 5 can be led to the exterior of the case 10 directly from the region of the case 10 where the wire harness 5 is received, and with this construction, a compact design of the installation apparatus can be achieved.

In the installation apparatus 1 of this embodiment, the slit 21 is formed in the upper wall of the case body 11 in intersecting relation to the folded-back portion of the wire harness 5, and therefore the slit 21 is formed generally in the widthwise-central portion of the upper wall of the case body 11 without being extremely offset to one of the opposite side edges of this upper wall. Namely, even when the slit is formed in the upper wall of the case body 11 to extend from the vicinity of the front end edge of the upper wall to the vicinity of the rear end edge thereof, so that the upper wall of the case body 11 is divided generally into two wall sections, the distance from one side edge of each of the two division wall sections (which is exposed to the slit 21) to the other side edge thereof supported by the side wall of the case body 11 will not become too large, and therefore the two division wall sections are prevented from having an insufficient strength.

The slit 21 is formed in the upper wall of the case body 11 in intersecting relation to the folded-back portion of the wire harness 5 as described above, and therefore the folded-back portion of the wire harness 5 is exposed to the exterior through this slit 21, and there is a possibility that a member which can pass through the slit 21 intrudes through the slit 21, and is brought into contact with the folded-back portion of the wire harness 5. In this embodiment, however, the folded-back portion of the wire harness 5 is covered with the protector 40, and therefore damage to the wire harness 5 can be prevented.

Furthermore, in the installation apparatus 1 of this embodiment, the proximal end-side portion of the wire harness 5, extending from the folded-back portion thereof toward the proximal end thereof, is prevented by the support portion 44 of the protector 40 from being bent in a meandering manner, and therefore damage to the wire harness 5 can be prevented.

Furthermore, the upper wall of the case body 11 is prevented from having the insufficient strength as described above, and therefore the material comprising aluminum as the main component or the resin material which are inferior in strength to an iron material can be used to form the case body 11. In the installation apparatus 1 of this embodiment, the tubular case body 11 has the slit 21 formed in the upper wall thereof and extending over the entire length thereof in the longitudinal direction thereof, and this case body 11 is made of the material comprising aluminum as the main component or the resin material, and is formed by extrusion.

The material, comprising aluminum as the main component, and the resin material are more lightweight and excellent in corrosion resistance than an iron material, and therefore the lightweight design of the installation apparatus 1 can be achieved. And besides, any surface treatment for anti-corrosion purposes, such as a coating or plating, does not need to be applied to the case body 11, and this contributes to preservation of the environment, and also the cost of the installation apparatus 1 can be reduced.

Furthermore, the case body 11, having the suitable length determined by the amount of sliding movement of the slide seat, can be formed by a single integral member produced by extrusion, and therefore in the installation apparatus 1, welding/fastening regions are eliminated, so that the installation apparatus 1 can be assembled easily, and besides the lightweight design of the installation apparatus 1 can be achieved.

Even in the case where instead of the material comprising aluminum as the main component, an iron sheet is used as a metal material for forming the case body 11, the iron sheet can be formed into a tubular shape by pressing or rolling although a coating or plating for anti-corrosion purposes is required. Therefore, in this case, also, the lightweight design can be achieved. Therefore, in this embodiment, although the case body 11 is formed by extrusion, it can be formed by pressing, rolling or the like.

In the installation apparatus 1 of this embodiment, although the slit 21 is formed in the upper wall of the case body 11, and extends over the entire length thereof, the opposite side walls of the case body 11 are prevented from tilting inwardly, and also the upper wall of the case body 11 (which is divided by the slit 21 into the two division wall sections each supported in a cantilever-like manner) is prevented from being bent, since the fitting portions 34 and 36 of the caps 12 and 13 are fitted respectively in the opposite end portions of the case body 11. Therefore, the strength of the case body 11 can be further increased.

Furthermore, in the installation apparatus 1 of this embodiment, the fastening members 29 and 30 pass through the bottom wall of the case body 11 respectively at the opposite end portions thereof to fasten the case body 11 to the vehicle body 6, and the one end of each fastening member is inserted deep in the fitting portion 34, 36 of the cap 12, 13 fitted in the end portion of the case body 11. Each of the caps 12 and 13 is prevented by the one end of the corresponding fastening member 29 and 30 from movement in the axial direction of the case body 11, and therefore even when the slider 14 is brought into abutting engagement with the cap 12, 13, the case 12, 13 is positively prevented from being disengaged from the end portion of the case body 11. Furthermore, the mounting of the case body 11 on the vehicle body 6 and the mounting of the caps 12 and 13 at the respective end portions of the case body 11 can be carried out at one time.

The present invention is not limited to the above embodiment, and suitable modifications, improvements, etc., can be made.

The present application is based on Japan Patent Application No. 2005-303293 filed on Oct. 18, 2006, the contents of which are incorporated herein for reference.

What is claimed is:

1. An installation apparatus for installing a wire harness over a fixed structural body and a movable structural body which is slidably provided to the fixed structural body, the installation apparatus comprising:
   a case that receives the wire harness such that the wire harness extends in a sliding direction of the movable structural body, and is folded back into a generally U-shape;
   a slider that holds a distal end-side portion of the wire harness extending from the folded-back portion toward a distal end of the wire harness, and is slidably supported on the case so as to move in the sliding direction of the movable structural body, and is movable in accordance with a sliding movement of the movable structural body; and
   a protector housing that is received within the case so as to move in the sliding direction of the movable structural body,
   wherein a slit is formed in a wall of the case, and extends in the sliding direction of the movable structural body;
   wherein the slit is arranged on the wall so as to intersect the folded-back portion of the wire harness in a top view thereof;
   wherein the distal end-side portion of the wire harness is led out from the case through the slit,
   wherein the fold back portion of the wire harness having the generally U-shape is directly horizontally arranged with respect to the wall of the case having slit, and
   wherein the protector housing receives the folded-back portion of the wire harness therein.

2. The installation apparatus according to claim 1, wherein the protector housing includes a support portion which extends along a part of the wire harness extending from the folded-back portion thereof toward a proximal end of the wire harness, and supports the part of the wire harness.

3. The installation apparatus according to claim 1, wherein the case includes:
   a tubular case body having the slit formed in a wall thereof so as to extend over an entire length of the wall in a longitudinal direction thereof; and
   caps respectively attached at opposite end portions of the case body to close opposite open ends of the case body; and
   wherein the case body is formed by an aluminum material as a main component or a resin material.

4. The installation apparatus according to claim 3, wherein each of the caps includes:
   a base plate portion closing the open end of the case body; and
   a fitting portion which is formed on and projects from the base plate portion, and is fitted in the end portion of the case body.

5. The installation apparatus according to claim 1, wherein the slit is formed in a widthwise central portion of the wall.

6. The installation apparatus according to claim 1, wherein the protector housing has a substantially semi-circular shape.

7. The installation apparatus according to claim 1, wherein the protector housing includes a substantially semi-circular shaped upper plate portion, a substantially semi-circular shaped bottom plate portion and a side plate portion that interconnects curved peripheral edges of each of the upper plate portion and the lower plate portion.

8. The installation apparatus according to claim 1, wherein the protector housing holds the folded-back portion of the wire harness so that a posture of the folded-back portion is horizontally arranged with respect to the wall of the case having the slit.

* * * * *